United States Patent
Sudo et al.

(10) Patent No.: US 10,911,684 B2
(45) Date of Patent: Feb. 2, 2021

(54) IMAGE PROCESSING APPARATUS AND CONTROL METHOD THEREOF

(71) Applicant: CANON KABUSHIKI KAISHA, Tokyo (JP)

(72) Inventors: Takayuki Sudo, Kawasaki (JP); Takashi Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 120 days.

(21) Appl. No.: 16/387,655

(22) Filed: Apr. 18, 2019

(65) Prior Publication Data

US 2019/0327423 A1    Oct. 24, 2019

(30) Foreign Application Priority Data

Apr. 24, 2018 (JP) ................. 2018-083366

(51) Int. Cl.
*H04N 5/232* (2006.01)
*H04N 1/00* (2006.01)

(52) U.S. Cl.
CPC ... *H04N 5/232939* (2018.08); *H04N 1/00129* (2013.01); *H04N 2201/0084* (2013.01)

(58) Field of Classification Search
CPC ......... H04N 5/232939; H04N 1/00129; H04N 2201/0084; H04N 5/2355
See application file for complete search history.

(56) References Cited

U.S. PATENT DOCUMENTS 9,967,533 B2 * 5/2018 Toma .................. G06T 5/009
10,063,828 B2 * 8/2018 Toma .................. H04N 9/8715

FOREIGN PATENT DOCUMENTS

| JP | 2007-228048 A | 9/2007 |
| JP | 2008-060676 A | 3/2008 |
| JP | 2015-109563 A | 6/2015 |
| JP | 2017-068207 A | 4/2017 |

* cited by examiner

*Primary Examiner* — Twyler L Haskins
*Assistant Examiner* — Angel L Garces-Rivera
(74) *Attorney, Agent, or Firm* — . Cowan, Liebowitz & Latman, P.C.

(57) ABSTRACT

An image processing apparatus generates a second image having a second dynamic range which is narrower than a first dynamic range by processing a first image having the first dynamic range, generates an image that includes a distribution image for indicating luminance distribution of the first image and a scale image for indicating a predetermined luminance level in the second dynamic range, and controls a display unit to display the image.

18 Claims, 10 Drawing Sheets

FIG. 5A
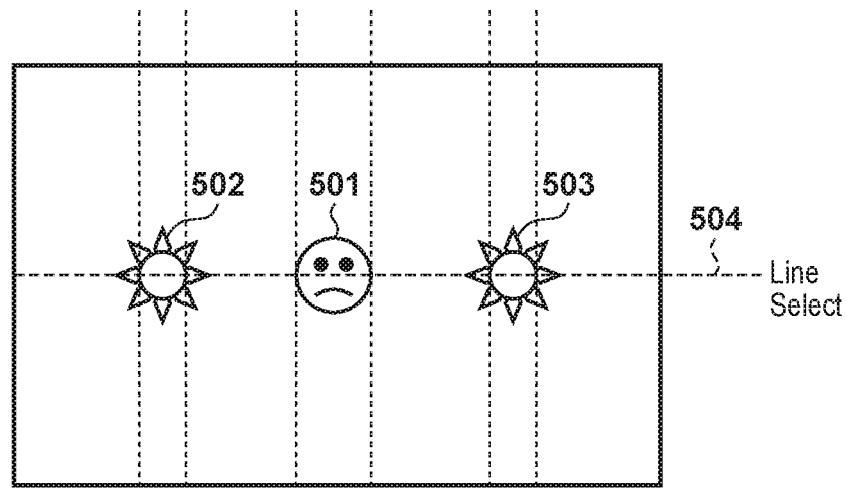
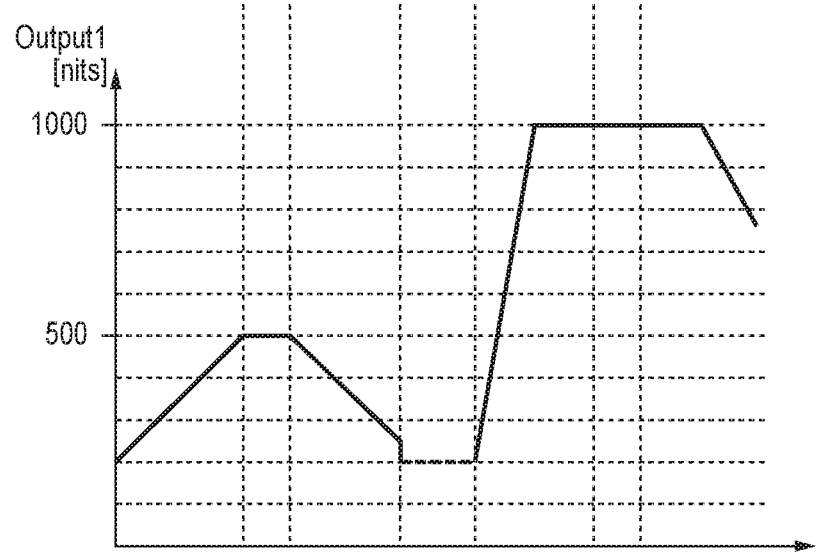
FIG. 5B

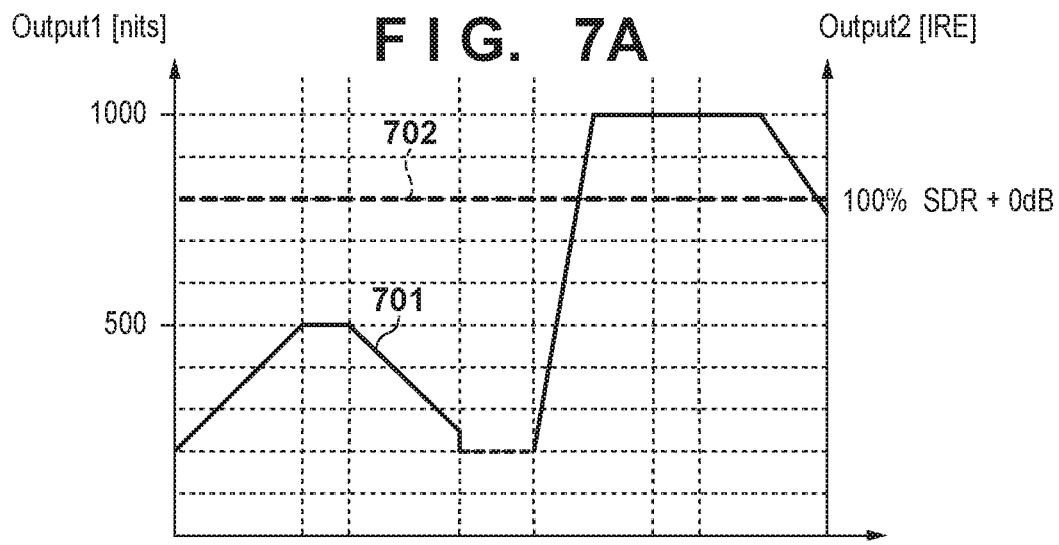
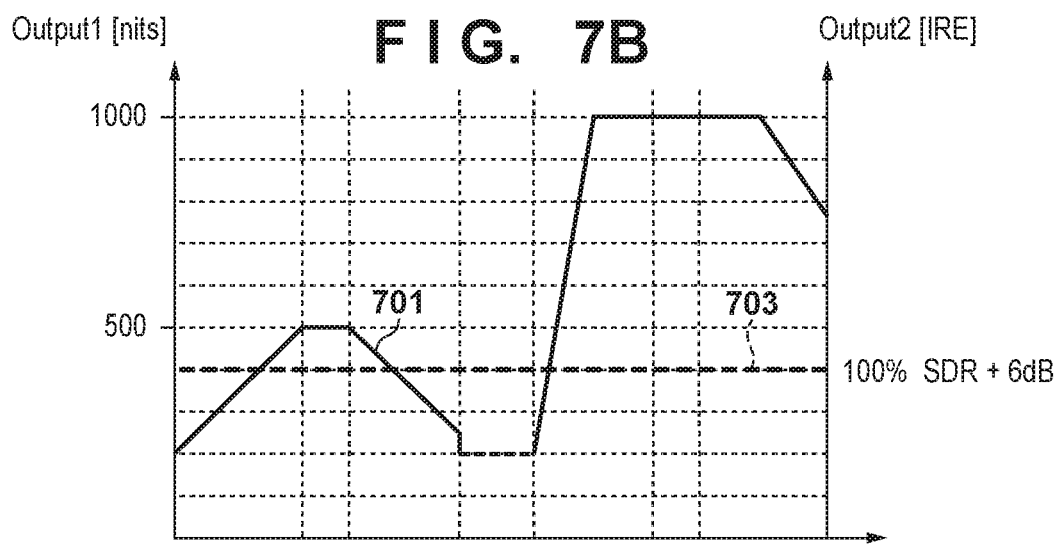
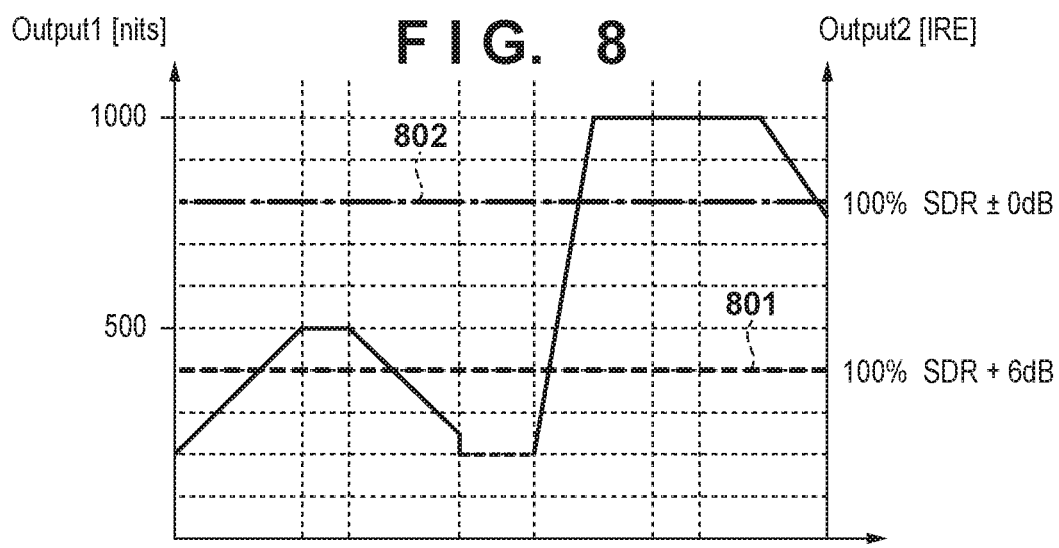

IMAGE PROCESSING APPARATUS AND CONTROL METHOD THEREOF

BACKGROUND OF THE INVENTION

Field of the Invention

The present invention relates to image processing technology that enables recording and output of a plurality of images with different tone characteristics.

Description of the Related Art

There exist display apparatuses that are capable of displaying images in a greater dynamic range (a high dynamic range (HDR)) than possible in the dynamic range of conventional display apparatuses (a standard dynamic range (SDR)). There exist image capturing apparatuses, such as a digital video camera, that can output image signals (HDR image signals) corresponding to the HDR in order to display images on these display apparatuses. Meanwhile, such image capturing apparatuses are also required to be capable of outputting SDR image signals in order for conventional display apparatuses to be able to display images. In recent years, digital video cameras have become available that can simultaneously output HDR image signals and SDR image signals.

Because an HDR image and an SDR image have different perceivable brightness levels when viewed on a display even if they are shot at the same exposure, the exposure is sometimes adjusted differently between the HDR image and the SDR image. In this case, the exposure may be adjusted while viewing the HDR image and the SDR image on different displays. The exposure may also be adjusted while switching between a wave form monitor (WFM) for the HDR image and a wave form monitor for the SDR image to check for any areas of blown-out highlights and check the skin brightness.

Japanese Patent Laid-Open No. 2015-109563 discloses a setting assistance function used during shooting in which the area of an image signal in a predetermined luminance level range is rendered and displayed in a predetermined color, and the area of the luminance wave form of the image signal that corresponds to the luminance level range is rendered and displayed in a color that corresponds to the predetermined color.

However, it is costly to prepare two viewing environments or two wave form monitors during shooting. In addition, it increases the operational burden on the user to determine the exposure while switching between two images and changing the setting of the display or the monitor in a single viewing environment (a display or a wave form monitor).

SUMMARY OF THE INVENTION

The present invention has been made in consideration of the aforementioned problems, and realizes technology that allows for the easy adjustment of the brightness and exposure of a plurality of images without increasing the cost and the operation burden on the user.

In order to solve the aforementioned problems, the present invention provides an image processing apparatus comprising: a processing unit configured to generate a second image by processing first image, wherein a dynamic range of the first image is included in a first dynamic range and a dynamic range of the second image is included in a second dynamic range which is narrower than the first dynamic range; a generation unit configured to generate an image that includes a distribution image for indicating luminance distribution of the first image and a scale image for indicating a predetermined luminance level in the second dynamic range, and a control unit configured to control a display unit to display the image.

In order to solve the aforementioned problems, the present invention provides an image processing apparatus comprising: a processing unit configured to generate a second image by processing a first image, wherein a dynamic range of the first image is included in a first dynamic range and a dynamic range of the second image is included in a second dynamic range which is narrower than the first dynamic range; a generation unit configured to generate an image that includes an indicator image for indicating an exposure index of the first image and a cursor image for indicating an exposure index of the second image in the indicator image; and a control unit configured to control a display unit to display the image.

In order to solve the aforementioned problems, the present invention provides a method of controlling an image processing apparatus, the method comprising: generating a second image by processing a first image, wherein a dynamic range of the first image is included in a first dynamic range and a dynamic range of the second image is included in a second dynamic range which is narrower than the first dynamic range; generating an image that includes a distribution image for indicating luminance distribution of the first image and a scale image for indicating a predetermined luminance level in the second dynamic range, and controlling a display unit to display the image.

In order to solve the aforementioned problems, the present invention provides a method of controlling an image processing apparatus, the method comprising: generating a second image by processing a first image, wherein a dynamic range of the first image is included in a first dynamic range and a dynamic range of the second image is included in a second dynamic range which is narrower than the first dynamic range; generating an image that includes an indicator image for indicating an exposure index of the first image and a cursor image for indicating an exposure index of the second image in the indicator image; and controlling a display unit to display the image.

In order to solve the aforementioned problems, the present invention provides a non-transitory computer-readable storage medium storing a program for causing a computer to execute a method of controlling an image processing apparatus, the method comprising: generating a second image by processing a first image, wherein a dynamic range of the first image is included in a first dynamic range and a dynamic range of the second image is included in a second dynamic range which is narrower than the first dynamic range; generating an image that includes a distribution image for indicating luminance distribution of the first image and a scale image for indicating a predetermined luminance level in the second dynamic range, and controlling a display unit to display the image.

In order to solve the aforementioned problems, the present invention provides a non-transitory computer-readable storage medium storing a program for causing a computer to execute a method of controlling an image processing apparatus, the method comprising: generating a second image by processing a first image, wherein a dynamic range of the first image is included in a first dynamic range and a dynamic range of the second image is included in a second dynamic range which is narrower than the first dynamic range;

generating an image that includes an indicator image for indicating an exposure index of the first image and a cursor image for indicating an exposure index of the second image in the indicator image; and controlling a display unit to display the image.

According to the present invention, the brightness, exposure, and the like of a plurality of images can be easily adjusted without increasing the cost and the operation burden on the user.

Further features of the present invention will become apparent from the following description of exemplary embodiments with reference to the attached drawings.

BRIEF DESCRIPTION OF THE DRAWINGS

FIGS. 5A and 5B are views illustrating shot objects and a wave form monitor.

FIGS. 7A and 7B are views illustrating scales of SDR images on wave form monitors.

FIG. 8 is a view illustrating different scales of an SDR image.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a first embodiment of the present invention.

Apparatus Configuration

First, the configuration and functions of a digital video camera according to the present embodiment will be described with reference to FIG. 1.

Figure 1:
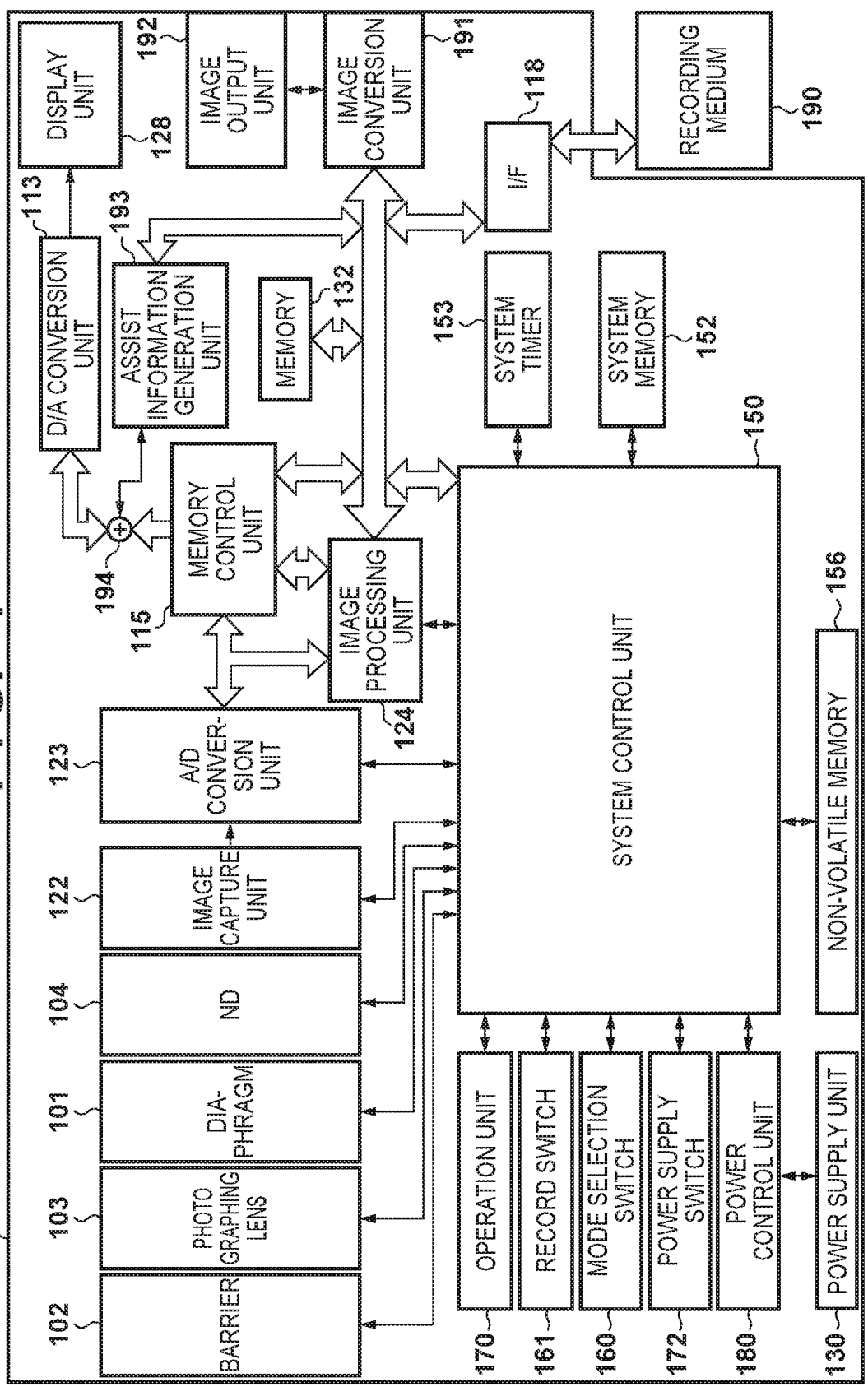
FIG. 1 is a block diagram showing the configuration of a digital video camera according to a first embodiment of the present invention.

In FIG. 1, a photographing lens 103 is a lens group that include a zoom lens and a focus lens, and forms an image of an object. A diaphragm 101 is used to adjust the amount of incident light. An ND filter 104 is used to adjust (attenuate) the amount of incident light separately from the diaphragm 101. An image capture unit 122 is an image sensor composed of a CCD, a CMOS, or the like that converts an optical image of an object to an electric signal. In addition, the image capture unit 122 is provided with functions, such as controlling storage by an electronic shutter, changing the analog gain and the readout speed, and the like. An A/D conversion unit 123 converts analog signals to digital signals. The A/D conversion unit 123 is used to convert analog signals output from the image capture unit 122 to digital signals. A barrier 102 covers an image capturing system of a digital video camera (referred to as "camera" hereinafter) 100 that includes the photographing lens 103 to protect the image capturing system, which includes the photographing lens 103, the diaphragm 101, and the image capture unit 122, from dirt and damage. The diaphragm 101, the barrier 102, the photographing lens 103, the image capture unit 122, and the A/D conversion unit 123 generate a RAW image signal based on an optical image obtained by capturing an image of an object, and output the RAW image signal to at least one of an image processing unit 124 and a memory control unit 115.

Figure 4:
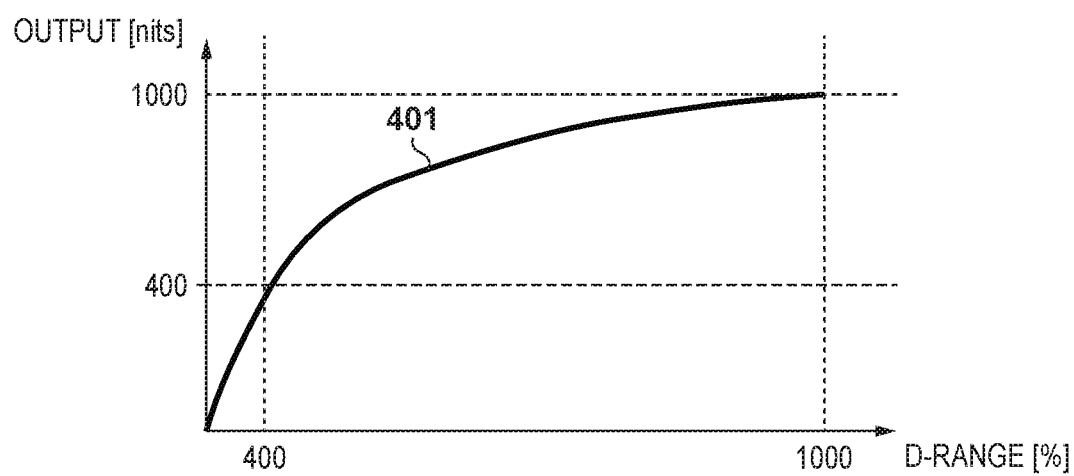
FIG. 4 is a view illustrating the gamma characteristics of an HDR image.

The image processing unit 124 includes a signal processing unit 201 that acquires an image signal (input image signal) from the A/D conversion unit 123 or the memory control unit 115 and converts the signal to an image signal with HDR tone characteristics (HDR image signal). In this embodiment, the HDR tone characteristics are PQ (Perceptual Quantization) characteristics in compliance with SMPTE ST 2084. The PQ characteristics are tone characteristics that correlate signal levels (a dynamic range or D-range) with a system of units (nits) in which display luminance values are expressed in absolute luminance. FIG. 4 shows the gamma characteristics of an HDR image. The solid line 401 indicates the gamma characteristics of the HDR image generated by the signal processing unit 201. If the D-range is 100%, 400%, or 1,000%, the display luminance value corresponds to 100 nits, 400 nits, or 1,000 nits, respectively. The following describes a case in which the maximum luminance value that can be expressed on a display is 1,000 nits. In this embodiment, information that indicates tone characteristics is stored in advance as a database in a non-volatile memory 156 or the like. Note that HDR tone characteristics may be HLG (Hybrid Log Gamma) characteristics in compliance with ITU-R BT.2100 or any other tone characteristics.

The image processing unit 124 may also perform processing such as color conversion, gamma correction, and addition of a digital gain on acquired image signals. Furthermore, a system control unit 150 can perform exposure control, distance-measuring control, white-balance control, etc., based on the results of predetermined computations performed by the image processing unit 124 on the image signals of captured still and moving images. As a result, processing such as TTL (through-the-lens) AF (auto focus)

processing, AE (auto exposure) processing, AWB (auto white balance) processing, and the like is performed.

An image conversion unit 191 includes a signal processing unit 202 that converts HDR image signals generated by the image processing unit 124 to SDR image signals with SDR tone characteristics that correspond to a narrower dynamic range than that of HDR tone characteristics. The signal processing unit 202 generates a SDR image by converting a dynamic range of the HDR image. A dynamic range of the SDR image is included in a SDR dynamic range. And a dynamic range of the HDR image is included in a HDR dynamic range. The SDR dynamic range is narrower than the HDR dynamic range. For example, the SDR dynamic range is from 0% to 400%, and the HDR dynamic range is from 0% to 800%. The image conversion unit 191 outputs the converted SDR image signals to an image output unit 192. The SDR tone characteristics are characteristics corresponding to the dynamic range that can be displayed by conventional display apparatuses, and are tone characteristics, γ1.9, γ2.2, and γ2.4, for example, in compliance with ITU-R BT. 709. The SDR tone characteristics are to be stored in advance in the non-volatile memory 156, or the like. Note that the SDR tone characteristics are corrected and determined according to an SDR gain that is set as described below.

Figure 3:
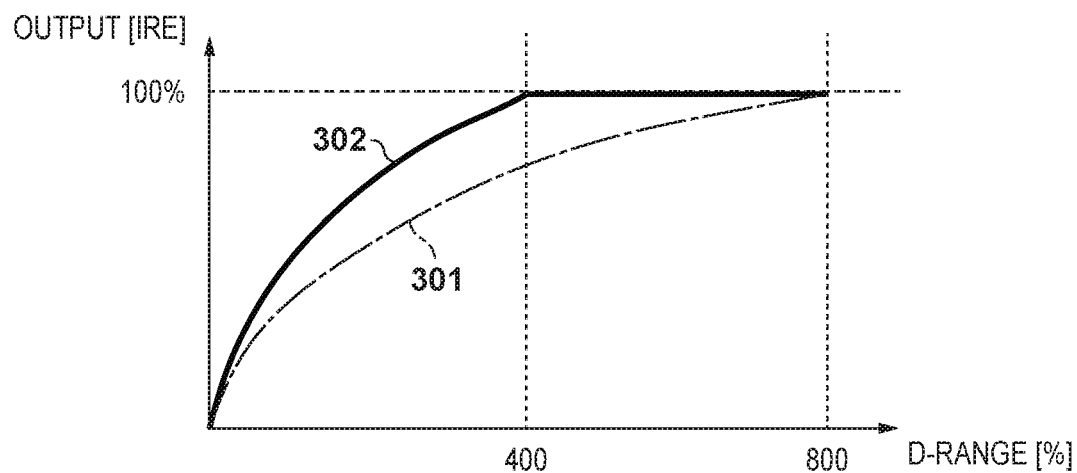
FIG. 3 is a view illustrating gamma characteristics before an SDR gain is changed.

FIG. 3 is a schematic diagram showing SDR tone characteristics. In FIG. 3, a broken line 301 indicates the SDR tone characteristics read out from the non-volatile memory 156. The SDR tone characteristics indicated by the broken line 301 can also be described as the SDR tone characteristics when an SDR gain of 0 dB is set for the SDR tone characteristics read from the non-volatile memory 156 (that is, before the SDR gain is changed). A solid line 302 indicates the SDR tone characteristics obtained when the SDR gain is set to 6 dB. In FIG. 3, the horizontal axis indicates the signal level (the dynamic range or D-range) and the vertical axis indicates the output level (IRE). An IRE (the acronym of the Institute of Radio Engineers) is a unit of luminance level of an image signal with 100 IRE defined as a luminance level of 100% white. SDR tone characteristics indicate luminance levels in relative values.

In addition, if the SDR gain is k times, multiplying the gamma characteristics 301 prior to the change in the SDR gain by 1/k times in the D-range direction gives the gamma characteristics 302 after the SDR gain is changed. In the first embodiment, if the D-range (HDR dynamic range) before the SDR gain is changed is 800% and if the SDR gain is set to +6 dB (double), the D-range (SDR dynamic range) after the change in the SDR gain becomes 400%, giving 400% as the saturation signal level of the D-range.

The image output unit 192 outputs SDR image signals output from the image conversion unit 191 to an external apparatus. The image output unit 192 is an image output terminal, such as HDMI®.

An image output unit 192 outputs HDR image signals output from the image processing unit 124 to an external apparatus. The image output unit 192 may, for example, be an interface that is connected to a recording medium 190, such as a memory card or a hard disk. FIG. 1 shows the image output unit 192 as being connected to the recording medium 190. The recording medium 190 is, for example, a memory card for storing shot images, and is comprised of a semiconductor memory or a magnetic disk, etc.

As described above, as separate circuits for generating HDR image signals and SDR image signals are provided, it is possible to generate and output HDR image signals and SDR image signals in parallel from the I/F 118 and the image output unit 192.

The memory control unit 115 stores (i.e., writes) RAW image signals obtained from the A/D conversion unit 123 and image signals obtained from the image processing unit 124 in a memory 132, and also reads image signals to be displayed from the memory 132 and outputs the signals to a signal superimposition unit 194. Note that the memory control unit 115 may directly output image signals obtained from the image processing unit 124 to the signal superimposition unit 194 as image signals to be displayed.

The memory 132 stores image signals captured by the image capture unit 122 and converted to digital data by the A/D conversion unit 123, as well as image signals to be displayed on the display unit 128. The memory 132 has sufficient storage capacity to store a moving images and audio of a predetermined length. The memory 132 also serves as a memory for storing image signals to be displayed (a video memory).

A D/A conversion unit 113 converts acquired digital image signals to analog signals and supplies the signals to the display unit 128. The display unit 128 is a display apparatus for displaying images based on the acquired analog signals. The display unit 128 may, for example, be a liquid crystal display module or an organic EL display module. For example, the display unit 128 may be an HDR-compatible display apparatus capable of displaying images with a luminance of up to 1,000 nits. Furthermore, the display unit 128 may also be an electronic viewfinder (EVF). The display unit 128 can display captured images in a live view display by causing the D/A conversion unit 113 to perform an analog conversion on digital signals that were subject to A/D conversion by the A/D conversion unit 123 and accumulated in the memory 132, and also successively transmitting the signals to the display unit 128 and displaying the signals.

The non-volatile memory 156 is an electrically erasable/ recordable memory, and, for example, an EEPROM is used. Constants, programs, and the like, for the system control unit 150 to operate are recorded in the non-volatile memory 156. The term "programs" as used herein refers to programs for executing various flowcharts to be described below in the present embodiment. The non-volatile memory 156 also stores tone-characteristic data for tone conversion of image signals executed by the signal processing unit 201 and the signal processing unit 202, which will be described below, and stores the data in a database corresponding to the sensitivity settings and gamma settings of the camera The system control unit 150 controls overall operations of the camera 100. In addition, the system control unit 150 includes a gain setting unit 203 for setting an SDR gain based on a user instruction input via an operation unit 170 and a scale position calculation unit 204 for calculating a scale position based at least on SDR tone characteristics. The system control unit 150 can implement the various processes of the digital video camera 100 by executing the programs recorded in the aforementioned non-volatile memory 156. The camera 100 also includes a system memory 152 for which a RAM is used. Constants and variables for the operation of the control unit 150, programs read from the non-volatile memory 156, and the like are loaded to the system memory 152. Additionally, the system control unit 150 also performs display control by controlling the memory 132, the D/A conversion unit 113, the display unit 128, and the like.

A system timer 153 is a time measurement unit for measuring the time periods of various types of controls and the time of an internal clock.

A mode selection switch 160, a record switch 161, and the operation unit 170 are the operation members for entering operational instructions to the system control unit 150.

The mode selection switch 160 switches the operation mode of the system control unit 150 between moving image recording modes, still image recording modes, and playback modes. The moving image recording mode and the still image recording mode include an auto shooting mode, an auto scene determination mode, a manual mode, a scene type mode, i.e., shooting settings for different types of scenes, a program AE mode, a custom mode, etc. The operation mode of the camera can be directly switched to any of these modes included in the moving image recording mode by operating the mode selection switch 160. Alternatively, after the mode selection switch 160 has been used to switch the operation mode to the moving image recording mode, another operation member may be used to switch to any of the modes included in the moving image recording mode. The record switch 161 is used to switch between a shooting standby state and a shooting state. Upon activation of the record switch 161, the system control unit 150 starts a series of operations from reading out a signal from the image capture unit 122 to writing recording data in the recording medium 190.

The operation members of the operation unit 170 serve as various types of function buttons, for example, by selecting various function icons shown on the display unit 128 to assign appropriate functions for different scenes. The functional buttons, for example, include a stop button, a return button, an image forward button, a jump button, a narrow-down button, an attribute change button, etc. For example, once a menu button is pressed, a menu screen on which various settings can be performed appears on the display unit 128. A user can intuitively perform various settings using the menu screen displayed on the display unit 128, four direction (up, down, right, and left) buttons, and a SET button.

A power supply switch 172 is an operation member for turning on or off of a power supply.

A power control unit 180 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 180 controls the DC-DC converter in accordance with the detection results and an instruction of the system control unit 101, and supplies a necessary voltage for a necessary length of time to each of the units including the recording medium 190.

A power supply unit 130 comprises a primary battery such as an alkaline battery or a lithium battery, a secondary battery such as an NiCd battery, an NiMH battery, or an Li-ion battery, or an AC adaptor.

An assist information generation unit 193 generates an assist image that indicates a characteristic value of an HDR image signal based on at least one of a RAW image signal and the HDR image signal. Furthermore, the assist information generation unit 193 generates an auxiliary image related to a characteristic value of an SDR image signal based on at least one of the RAW image signal and the HDR image signal and SDR tone characteristics, and also combines the auxiliary image and the assist image.

In the first embodiment, the characteristic value is a luminance value. Additionally, the assist image is a wave form monitor image comprised of a luminance wave form that indicates the luminance value of the HDR image signal at each horizontal position and a scale corresponding to the characteristics of the HDR image. Note that the generated luminance wave form may alternatively be a wave form that indicates the luminance value at each vertical position. Furthermore, the assist information generation unit 193 generates a scale image that indicates a luminance value corresponding to the signal level (reference luminance level) predetermined in the SDR image signal, based on the HDR tone characteristics and the SDR tone characteristics. Note that the assist information generation unit 193 may alternatively generate a scale image by referring to a gain value (SDR gain). As a result, the user can easily confirm the areas where the reference luminance level has been exceeded in the luminance wave form by referring to the wave form monitor image. For example, if the reference luminance level is set in advance to the signal level at which saturation occurs in the SDR tone characteristics, the user can confirm the saturated areas in the SDR image signal.

A wave form monitor image is a distribution image that shows the distribution of the luminance values of an image signal on a horizontal line set by the user. In a luminance wave form, the horizontal axis indicates horizontal positions and the vertical axis indicates luminance values. In the wave form monitor image, the luminance values of the image at horizontal positions are plotted against the respective positions. Note that the wave form monitor image may alternatively be an image that indicates the luminance distribution of a single screen image by creating a luminance wave form for each horizontal line of an HDR image signal and combining the luminance wave forms for the screen image. In this case, the luminance wave form is an image in which the x-coordinate of each pixel indicates the horizontal position of the image signal, the y-coordinate indicates the luminance value, and the pixel value indicates the frequency of occurrence of the luminance indicated at the y-coordinate. If the vertical line through a horizontal position x1 of the image signal is formed by pixels having the same luminance value y1, in the luminance signal wave form, only the pixels with the y-coordinates corresponding to y1, from among the group of pixels that have an x-coordinate corresponding to x1, have values and the pixels with other y-coordinates have no value. Moreover, as a pixel value in the luminance wave form increases with the frequency of occurrence, the pixel is displayed with a correspondingly higher luminance.

The signal superimposition unit 194 is a data adder unit that combines an HDR image signal generated from the memory control unit 115 with an assist image signal generated by the assist information generation unit 193 by superimposing the assist image signal on the HDR image signal. The signal superimposition unit 194 outputs the combined image signal to the D/A conversion unit 113.

The D/A conversion unit 113 converts a digital image signal acquired from the signal superimposition unit 194 to an analog signal and outputs it to the display unit 128. An HDR image is displayed as a full screen image on the display unit 128, and a wave form monitor image including a scale of an SDR image is displayed on a part of an area of the screen.

Next, the functional blocks that implement the processing to generate an HDR image, an SDR image, a wave form monitor, and a scale of the first embodiment will be described with reference to FIG. 2.

The processing according to the present embodiment is implemented by the signal processing unit 201, the signal processing unit 202, the gain setting unit 203, and the scale position calculation unit 204.

The following describes a case in which a user adjusts the brightness of an SDR image while viewing a wave form monitor that includes a scale of the SDR image and performs simultaneous HDR/SDR recording.

While the signal processing by the image processing unit 124 includes white-balance control and outline emphasis, detailed description thereof is omitted as these are known technology. Moreover, each block in FIG. 2 is capable of acquiring, from the system control unit 150, any data stored in the camera, including exposure parameters, such as diaphragm information, ND information, and shutter speed.

Figure 2:
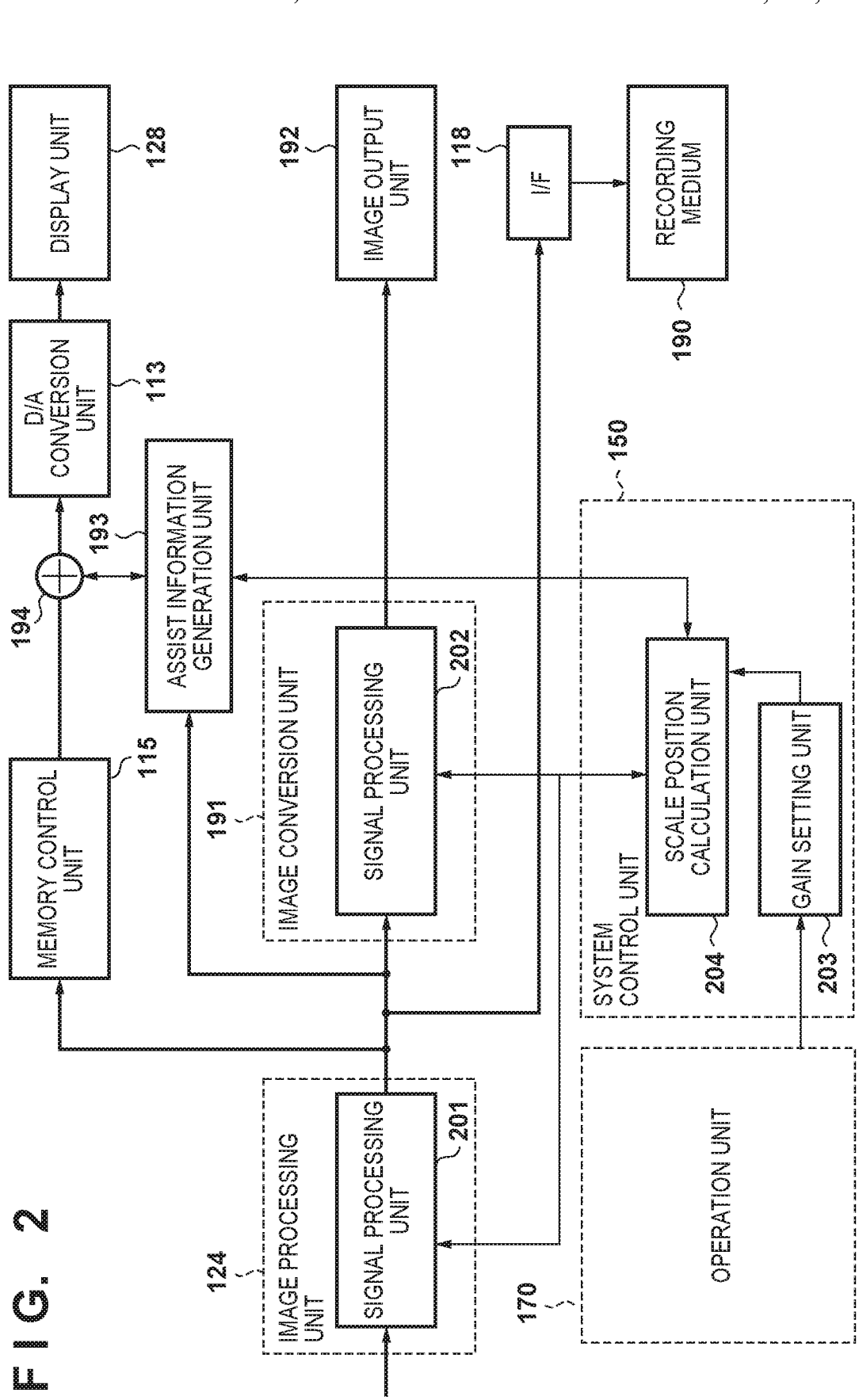
FIG. 2 is a functional block diagram to implement processing to generate an HDR image, an SDR image, a wave form monitor, and a scale according to the first embodiment.

In FIG. 2, the signal processing unit 201 performs, on a digital signal converted from a RAW image signal by the A/D conversion unit 123, tone conversion that changes the input/output characteristics (gamma characteristics) so as to generate an HDR image signal. The HDR image signal generated by the signal processing unit 201 is recorded in the recording medium 190 via the I/F (interface) 118. Additionally, the HDR image signal generated by the signal processing unit 201 is output to the signal superimposition unit 194 via the memory control unit 115 and displayed on the display unit 128 via the D/A conversion unit 113.

The signal processing unit 202, after performing de-gamma processing on the HDR image signal generated by the signal processing unit 201, performs tone conversion based on the SDR tone characteristics read from the memory 132 and the SDR gain set by the gain setting unit 203. In this way, an SDR image signal is created in which the input/output characteristics (gamma characteristics) of the HDR image signal are changed. Here, de-gamma processing is inverse transformation of the tone conversion performed by the signal processing unit 201 to convert a RAW image signal to an HDR image signal. In other words, de-gamma processing inversely transforms an HDR image signal to a RAW image signal. Therefore, the signal processing unit 202 may be described as being capable of executing processing for converting a RAW image signal to an SDR image signal based on SDR tone characteristics and an SDR gain. Note that, while tone conversion from an HDR image signal to SDR image signal may involve color gamut conversion, detailed description thereof is omitted herein as it is not pertinent to the present embodiment. The SDR image signal generated by the signal processing unit 202 is output to the image output unit 192 and can be recorded and displayed on an external apparatus (not shown). The user can confirm the luminance and the exposure of the HDR image while recording the HDR image signal in the recording medium 190 and displaying it on the display unit 128. Also, simultaneous HDR/SDR recording can be performed by outputting the SDR image signal to an external apparatus or the like for recording.

The gain setting unit 203 sets an SDR gain value according to an operation made by a user. The scale position calculation unit 204 calculates, based on the HDR tone characteristics applied by the signal processing unit 201 and the SDR tone characteristics applied by the signal processing unit 202, the position indicating the scale that corresponds to the reference luminance level of the SDR image signal on the wave form monitor image of the HDR image.

FIG. 5A illustrates objects shot by the camera of the present embodiment. FIG. 5A shows three objects, i.e., a person's face 501 with a luminance value of 200 nits, and light sources 502 and 503 with luminance values of 500 nits and 1,500 nits, respectively. Also shown is a cursor (Line Select) 504 for specifying the lateral line position at which a luminance signal wave form is generated.

FIG. 5B is a schematic diagram showing a wave form monitor image generated based on an HDR image signal. If a RAW image signal obtained by capturing images of the objects shown in FIG. 5A is converted to an HDR image signal based on the HDR tone characteristics 401, the light source 503, which has over 1,000 nits, and its surrounding area are saturated at 1,000 nits because a dynamic range over 1,000 nits cannot be expressed. Accordingly, in the wave form monitor image of FIG. 5B, the light source 502, which has 500 nits, and its surrounding area are shown with a luminance distribution corresponding to the luminance of the object, while the light source 503 and its surrounding area are shown as being saturated at 1,000 nits. Note that, while the luminance values are expressed as Y-signals in nits in this example, these values may be expressed in IRE or RGB signals in wave form monitor display.

Figure 6:
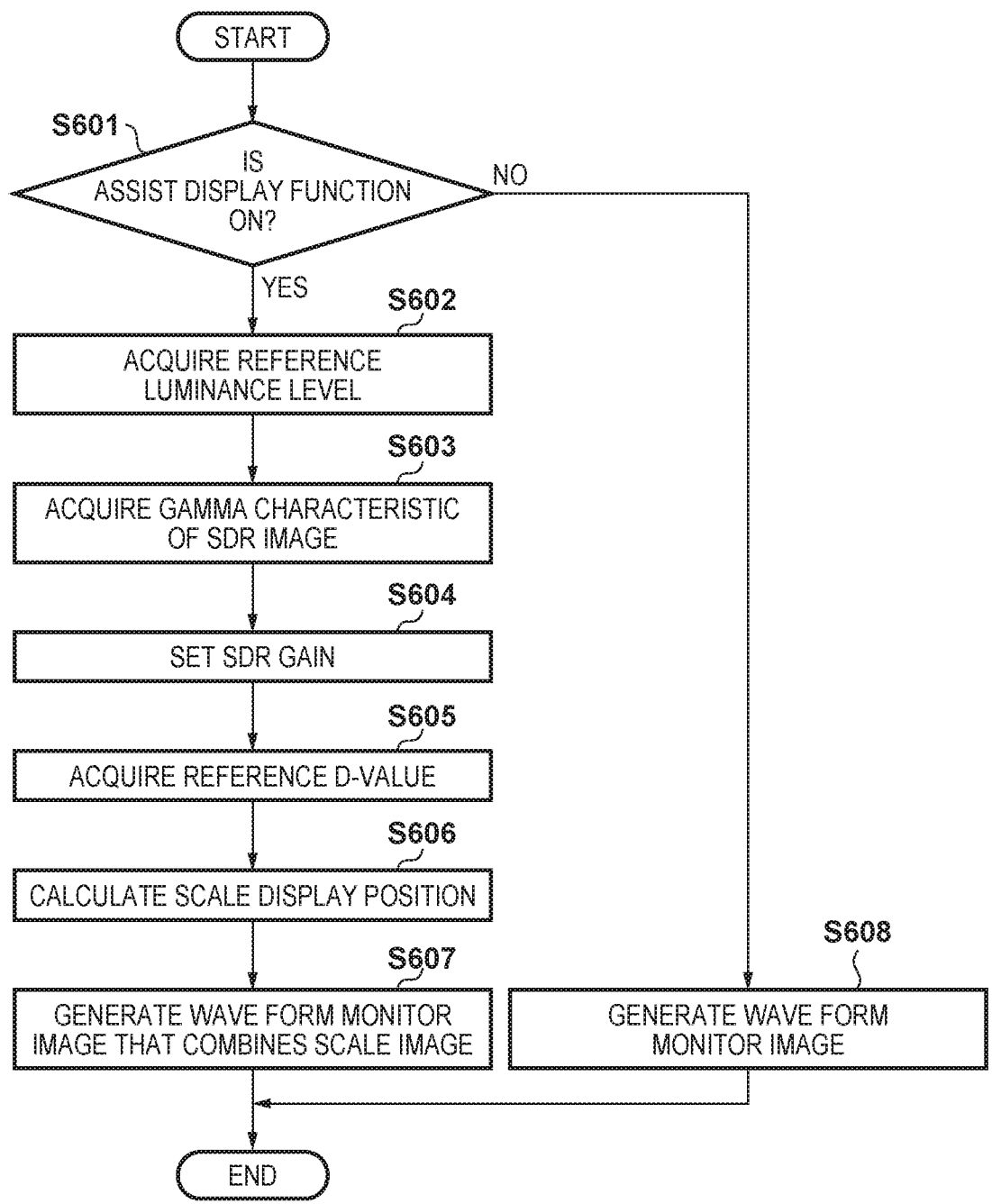
FIG. 6 is a flowchart illustrating processing to add a scale of an SDR image to a wave form monitor of an HDR image.

Described below with reference to FIG. 6 is the processing to add a scale image that indicates a reference luminance level of an SDR image signal to a wave form monitor image generated based on an HDR image signal.

Here, the HDR tone characteristics are the tone characteristics 401 shown in FIG. 4, and the SDR tone characteristics are the tone characteristics 301 shown in FIG. 3.

In addition, the processing shown in FIG. 6 is executed by the system control unit 150 reading a control program from the non-volatile memory 156 and deploying and executing the program on the system memory 152 to control the blocks shown in FIG. 2.

In step S601, based on the presence or absence of a setting instruction from the operation unit 170, the system control unit 150 determines whether or not an assist display function to display an SDR image scale on a wave form monitor of an HDR image is turned on. The system control unit 150 proceeds to step S602 if it is determined that the assist display function is turned on, and proceeds to step S608 if it is determined that the function is turned off. That is, if the assist display function is turned on, as described below, the system control unit 150 controls the display unit 128 to display a wave form monitor image that includes an SDR image scale on the display unit 128.

In step S602, the system control unit 150 acquires the reference luminance level of the SDR image shown on the wave form monitor. The reference luminance level can be set freely according to the luminance level of the SDR image signal the user desires to focus on. In this example, the reference luminance level is the saturation level (IRE 100%) of the SDR image signal. As a result, the user can easily determine the presence or absence of areas of blown-out highlights and the locations of such areas in the SDR signal while checking the luminance wave form of the HDR image. Alternatively, the reference luminance level may be set to approximately IRE 70 to 75%, which serves as a standard for the luminance level of human skin for image shooting. Note that the reference luminance level may be changed according to an operation made by the user.

In step S603, the system control unit 150 acquires the gamma characteristics to be used in SDR image conversion. The gamma characteristics to be used in SDR image conversion are stored in advance in the database of the non-volatile memory 156. The system control unit 150 may acquire information, such as the gamma characteristics 301 shown in FIG. 3, according to the camera settings.

In step S604, the gain setting unit 203 of the system control unit 150 sets the SDR gain according to an instruction input by the user via the operation unit 170. Note that the SDR gain may be set by reading a preset value from the memory 132.

In step S605, the system control unit 150 determines the D-range value (reference D-value) that corresponds to the reference luminance level of the SDR image based on the gamma characteristics 301 in FIG. 3. If the reference luminance level is IRE 100%, the reference D-value is 800% based on the gamma characteristics 301 in FIG. 3.

In step S606, the scale position calculation unit 204 of the system control unit 150 determines the luminance of the HDR image that corresponds to the reference D-value. The luminance of the HDR image corresponding to the reference D-value corresponds to the position in the luminance wave form at which the scale that indicates the reference luminance level of the SDR image signal is displayed (display position). The scale position calculation unit 204 calculates the display position of the SDR image scale in the luminance wave form of the HDR image and outputs the display position to the assist information generation unit 193. The scale position calculation unit 204 acquires the gamma characteristics 401 in FIG. 4 from the database stored in the non-volatile memory 156. The scale position calculation unit 204 calculates, from the acquired gamma characteristics 401 and the reference D-value, the luminance of the HDR image (the display luminance value [nits] of the display) that corresponds to the reference D-value. In this embodiment, the display luminance value of 800 nits of the display, which corresponds to the D-range of 800%, is determined, based on the gamma characteristics 401 in FIG. 4, as the scale position that indicates the reference luminance level of the SDR image signal.

In step S607, the assist information generation unit 193 generates the luminance wave form of the HDR image. Furthermore, the assist information generation unit 193 generates a wave form monitor image that combines the luminance wave form of the HDR image, a scale that indicates the luminance of the HDR image, and the reference luminance level of the SDR image signal.

FIGS. 7A and 7B show examples of assist display in which the SDR image scale is shown on the wave form monitor of the HDR image signal. FIG. 7A shows a luminance wave form 701 of the HDR image signal and the scale 702 that indicates the position of the 100% saturation signal level of the SDR image signal. Furthermore, in FIG. 7A, the first axis (Output 1) of the wave form monitor corresponds to the luminance value (nits) of the HDR image signal, and the second axis (Output 2) corresponds to the luminance value (IRE) of the SDR image signal. In the present embodiment, the scale 702, which indicates the 100% saturation signal level of the SDR image signal, is displayed on the line at 800 nits on the wave form monitor.

In step S608, the system control unit 150 causes the assist information generation unit 193 to generate a wave form monitor image formed only of the luminance wave form of the HDR image signal. Furthermore, the assist information generation unit 193 generates a wave form monitor image that combines the luminance wave form of the HDR image signal and a scale that indicates the luminance of the HDR image signal.

The following describes a case in which the SDR gain is changed from 0 dB to 6 dB. Specifically, description is given for a case where the gamma characteristics of the SDR image signal are the gamma characteristics 302 in FIG. 3. The processing procedure is the same as the flowchart in FIG. 6.

If the SDR gain is changed from 0 dB to 6 dB, in step S605, the SDR tone characteristics are calculated as the gamma characteristics 302 based on the SDR gain value and the gamma characteristics 301 in FIG. 3. Then, the reference D-value, which corresponds to the reference signal level of the SDR image signal that is calculated in step S606, becomes 400%. Therefore, if the SDR gain is 6 dB, the scale position in the SDR image displayed in step S607 corresponds to the position of 400 nits of the HDR image signal. Accordingly, the wave form monitor image is changed to that shown in FIG. 7B. As the SDR gain does not affect the HDR image, the luminance signal wave form 701 of the HDR image remains unchanged.

As described above, the blown-out highlights (saturation) of an SDR image signal and the brightness of objects or the like can be easily identified by adding a scale indicating a predetermined signal level (reference luminance level) of the SDR image signal to the luminance wave form of the HDR image signal. Additionally, by determining the scale position that corresponds to the reference luminance level based on an SDR gain, changes in the blown-out highlights, etc., due to the change in the SDR gain can be easily confirmed. For example, in FIGS. 7A and 7B, it is easy to recognize that the area of the light source 502 is not saturated if the SDR gain is 0 dB, while blown-out highlights occur in that area if the SDR gain is changed to 6 dB.

Note that, in the present embodiment, as a scale is generated based on HDR tone characteristics, which have a wider D-range than SDR tone characteristics, information can be generated regarding the areas where saturation would occur in an SDR image signal.

Furthermore, in the present embodiment, as no circuit for generating a luminance wave form from an SDR image signal is required, there is no need to provide a plurality of luminance wave form generation circuits for a plurality of image signals. Therefore, as the circuitry for generating luminance wave forms can be kept to a minimum, the overall circuit size can be reduced.

Note that, in order to show the user that the SDR gain has been changed, the manner in which the second axis of the wave form monitor or the scale of the SDR image signal after the SDR gain has been change are displayed to the user may be changed. In this case, for example, the colors of the second axis of the wave form monitor and the scale of the SDR image signal may be changed, or the second axis and the scale may be caused to flash on and off.

Note that it is also possible to generate and display one scale for each of a plurality of reference luminance levels. The following describes, with reference to FIG. 8, a case in which a plurality of scales that correspond to a plurality of reference luminance levels are displayed.

FIG. 8 shows an example in which two scales of the SDR image, one for the SDR gain of ±0 dB and the other for +6 dB, are set on the wave form monitor of the HDR image signal.

FIG. 8 shows a scale 801 for the SDR image signal if the SDR gain is set to +6 dB. Also shown is a scale 802 of the SDR image signal if the SDR gain is set to ±0 dB.

The scale 801 is calculated based on the SDR gain value applied by the signal processing unit 202 (the SDR gain value set via the gain setting unit 203), following the procedure shown in FIG. 6. Meanwhile, the scale 802 is calculated based on an SDR gain value different from the gain value set via the gain setting unit 203. This different gain value may be a change instruction from the user, or may be set as an initial gain value that is −6 dB smaller than that applied by the signal processing unit 202.

In this way, the scale of the SDR image signal calculated based on the SDR gain value applied by the signal processing unit 202 and the scale calculated based on the gain value different from the foregoing are added to the wave form monitor. As a result, it is possible to easily determine to what level the SDR gain should be reduced to improve, for example, the blown-out highlights of the SDR image signal.

Note that, while a luminance wave form of an HDR image signal is used as the assist display function for an SDR image signal in the first embodiment, a luminance histogram may also be used. In this case, a luminance histogram that indicates the luminance value of each pixel as a frequency may be generated from the HDR image signal, and a scale that indicates the saturation luminance value of the SDR image signal may be displayed on the luminance histogram.

Additionally, in the first embodiment, a case in which a scale of an SDR image signal is displayed on the display unit 128 of the camera was described. But a scale of an SDR image signal may be added to an HDR image signal that is output to an external apparatus. In this case, the added information can be analyzed at the destination, i.e., the external apparatus, where the scale of the SDR image signal can be displayed on the wave form monitor of the HDR image.

Second Embodiment

The following describes a second embodiment of the present invention. In the above-described first embodiment, the assist image that indicates characteristics of an image is a luminance wave form that indicates the distribution of luminance. In the second embodiment, however, a case is described in which the assist image is an exposure indicator that indicates the exposure of an image. In the second embodiment, an exposure indicator that indicates the exposure of an HDR image is combined with an auxiliary image that indicates the exposure of an SDR image.

The configuration of a digital video camera 100 of the second embodiment is the same as shown in the configuration diagram in FIG. 1 of the first embodiment. The digital video camera of the second embodiment is different from the first embodiment in the processing performed by the assist information generation unit 193 and the signal superimposition unit 194. As the rest of the configuration is similar to the first embodiment, description thereof is omitted herein.

Figure 10:
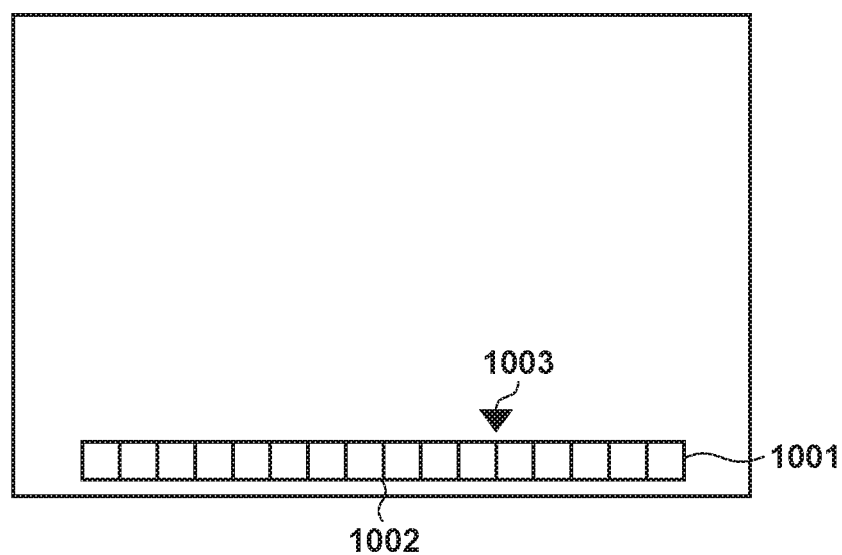
FIG. 10 is a view illustrating a conventional exposure indicator.

The assist information generation unit 193 generates exposure index data to be displayed in an exposure indicator. The exposure indicator is an assist image that includes an exposure index (cursor image) 1003 for indicating the exposure of an image signal (brightness characteristic value (an evaluation value)) and a scale 1001 for a user to recognize the exposure indicated by the cursor. FIG. 10 shows an example of how the exposure indicator is displayed. On the exposure indicator, a correct exposure position 1002 determined by the camera is set at the central marking of the scale 1001. Additionally, the exposure index 1003 in the shape of an inverted triangle is shown at the exposure position of a shot image. If the evaluation value of the brightness calculated from the signal level of the shot image exceeds the correct exposure, the exposure index 1003 is displayed to the right of the correct exposure position 1002, and if the evaluation value of the brightness calculated from the signal level of the shot image is under the correct exposure, the exposure index 1003 is displayed to the left of the correct exposure position 1002. In other words, the larger the difference is between the evaluation value and the correct exposure, the farther away the exposure index 1003 is displayed from the centrally located, correct exposure position 1002, which represents the current exposure. Note that the brightness evaluation value may be calculated using any known method. For example, the brightness evaluation value may be: an average of the signal levels over an entire image; a weighted average obtained by dividing the image into a plurality of regions and performing weighting according to the objects included in the regions or the locations within the image; or an index that takes into account an average signal level and a peak signal level. Furthermore, the image signal used for calculating the evaluation value may be a luminance signal, a color signal, or a signal that combines the luminance signal and the color signal for each pixel.

Next, an exposure indicator that indicates the exposure of an HDR image signal and the exposure of an SDR image signal will be described hereinafter with reference to FIGS. 11A to 11C.

Figure 11A:
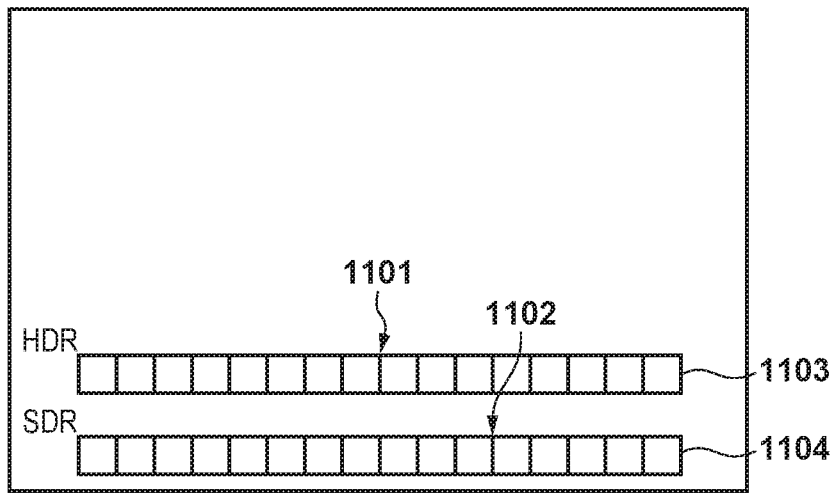
FIGS. 11A to 11C are views illustrating exposure indicators of the second embodiment.

FIG. 11A shows an example in which an exposure index 1101 of an HDR image signal and an exposure index 1102 of an SDR image signal are displayed as cursors on different scales 1103 and 1104, respectively. FIG. 11B shows an example in which the exposure index 1101 of the HDR image signal and the exposure index 1102 of the SDR image signal are displayed as cursors on the same scale 1105. FIG. 11C shows an example in which the exposure index 1101 of the HDR image signal is arranged on the scale 1105 as a cursor, and the exposure index of the SDR image signal is shown as a relative value with respect to the exposure of the HDR image signal.

Figure 11B:
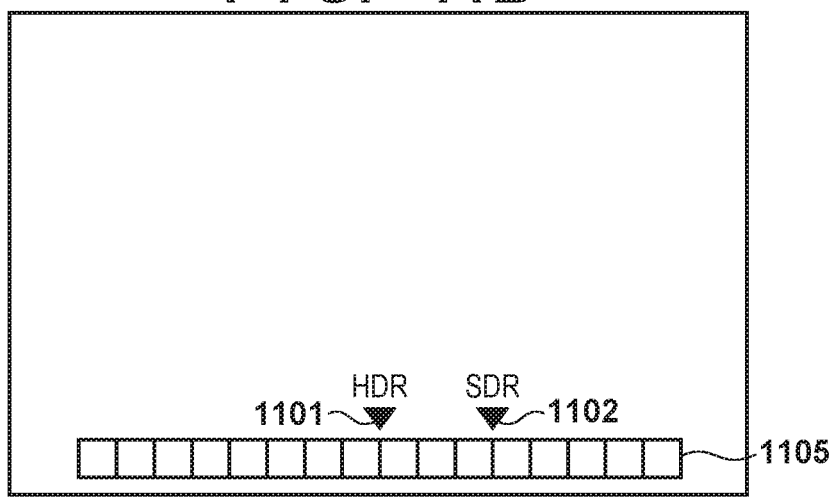
Figure 11C:
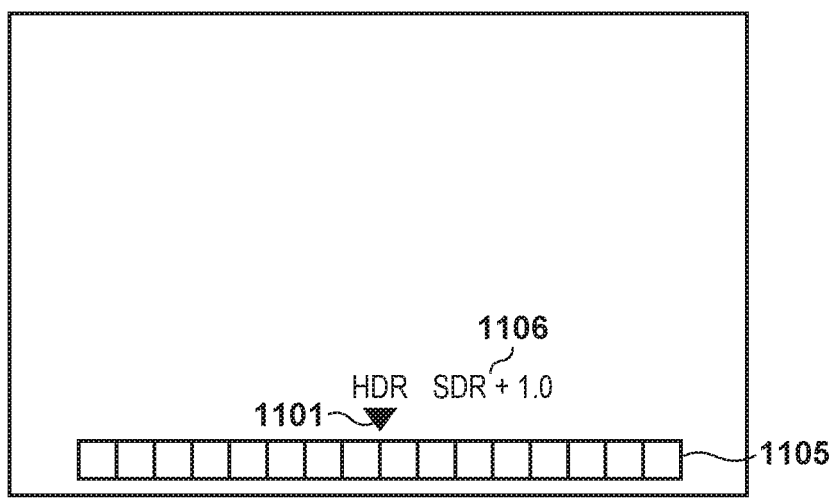

As shown in FIGS. 11A to 11C, the exposure index 1101 of the HDR image signal and the exposure index 1102 or 1106 of the SDR image signal can be displayed simultaneously on the exposure indicator. As a result, even if an image based on the HDR image signal or an image based on the SDR image signal is displayed on the display unit 128, the user can simultaneously view the exposure indexes of both image signals. Therefore, it is not necessary to check the brightness by switching between the images according to the object, and the brightness of one image can be checked while viewing the other image.

An image signal combining an assist image that includes an exposure index of an HDR image signal and an auxiliary image that indicates an exposure index of an SDR image signal generated by the assist information generation unit 193 is superimposed, by the signal superimposition unit 194, on the image signal input via the memory control unit 115 and displayed on the display unit 128 via the D/A conversion unit 113.

Figure 9:
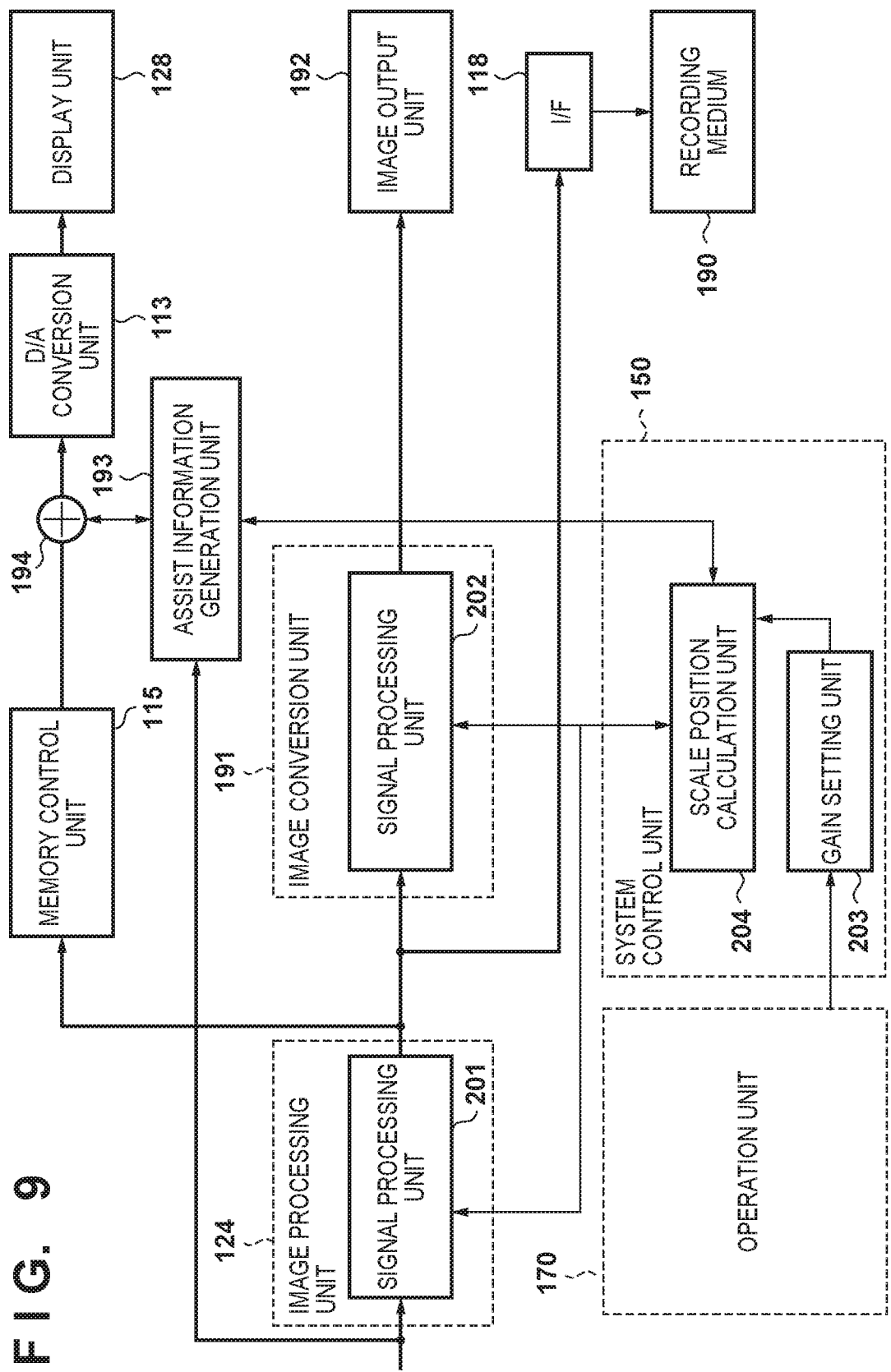
FIG. 9 is a functional block diagram to implement processing to add an exposure index to an exposure indicator according to a second embodiment.

Next, the processing to add an exposure index to an exposure indicator according to the present embodiment will be described with reference to FIG. 9.

A RAW image signal is input to the assist information generation unit 193 via the memory control unit 115. As a signal with a linear characteristic with respect to the quantity of light of the input image is preferable to calculate the exposure index, a RAW image signal before tone conversion by the signal processing unit 201 is input to the assist information generation unit 193. The assist information generation unit 193 generates the exposure index of an HDR image signal by acquiring a photometric value of the HDR image signal from the RAW image signal before tone conversion input via the memory control unit 115 and the gain value (SDR gain) set by the gain setting unit 203 output from the scale position calculation unit 204. Additionally, the assist information generation unit 193 generates the exposure index of an SDR image signal by acquiring a photometric value of the SDR image signal from the photometric value of the HDR image signal and the SDR gain.

To calculate the exposure indexes of an HDR image signal and an SDR image signal, it is common practice to acquire a photometric value using a photometric circuit provided for each of the two image signals and calculate the evaluation values of the two image signals from the photometric values to thereby generate exposure indexes for the two image signals. However, as this requires a plurality of photometric circuits, the circuit configuration will be extremely large. Moreover, the SDR image signal is generated by performing relative signal conversion of the HDR image signal. As a result, if a positive SDR gain value is set, a saturated signal is generated due to amplification, and correct photometry cannot be performed on the image signal lost due to saturation, thus preventing relatively accurate photometry of the SDR image signal.

In contrast, the present embodiment acquires photometric values of the two image signals by focusing on the fact that the RAW image signal input to the assist information generation unit 193 has linear characteristics with respect to the quantity of light of the input image and that the photometric values also have linear characteristics with respect to the quantity of light of the input image. More specifically, the photometric value of the SDR image signal is not obtained by performing photometry on the SDR image signal; rather, the photometric value of the HDR image signal is used as a substitute for the photometric value of the SDR image signal by linearly converting (amplifying) the photometric value of the HDR image signal according to an SDR gain. The photometric value of the SDR image signal thus obtained is converted to a sufficiently compact format compared to the SDR image signal. As a result, the photometric value can be advantageously handled by software as a numeric data that has sufficient bit accuracy without losing information despite the linear conversion (amplification) of the value according to the gain value.

Figure 12:
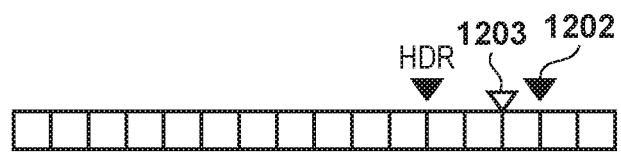
FIG. 12 is a view that comparatively shows exposure indexes of an SDR image obtained using the results of photometry of an SDR image and the results of photometry of an HDR image.

FIG. 12 comparatively shows, on an exposure indicator 1202, an exposure index 1202 of an SDR image signal generated using on a photometric value of the SDR image signal that is determined by converting (amplifying) the photometric value of an HDR image signal with an SDR gain value of 3 dB, and an exposure indicator 1203 of the SDR image signal generated based on a photometric value obtained by performing photometry on the SDR image signal. According to the present embodiment, information is not lost even if linear amplification that corresponds to the SDR gain value is performed, thus enabling the acquisition of an accurate photometric value without requiring a large circuit configuration. Also, evaluation values of the two image signals based on the photometric values of the image signals determined from the photometric value of one RAW image signal are calculated and superimposed on the input image by the signal superimposition unit 194. Due to the above, the exposure conditions of the HDR image signal and the SDR image signal can be simultaneously checked without switching between the input images.

In the foregoing embodiments, cases are described in which a RAW image signal before the signal processing unit 201 performs tone conversion thereon is input to the assist information generation unit 193 from the memory control unit 115. Alternatively, as an image signal input to the assist information generation unit 193 will also suffice as long as it is linear with respect to the quantity of light of the input image, an SDR image signal output from the signal processing unit 202 may also be used. In this case, as nonlinear tone conversion is performed by the signal processing unit 202 on the quantity of light of the input image similar to the SDR image signal, it is sufficient that the image signal that is tone-converted by the signal processing unit 202 to a signal linear with respect to the quantity of light of the input image is to output to the assist information generation unit 193. Furthermore, as the SDR image signal is amplified with respect to the HDR image signal according to an SDR gain value, a photometric value of the HDR image signal can be relatively calculated by using the photometric value of the SDR image signal amplified by the sign-inverted SDR gain value.

Moreover, even if the image signal input to the assist information generation unit 193 is a nonlinear signal with respect to the quantity of light of the input image, a photometric value may also be acquired after the image signal is converted to a signal linear with respect to the quantity of light of the input image by the assist information generation unit 193.

The following describes the processing performed when the SDR gain is changed. In simultaneous HDR/SDR recording, the SDR gain value set to optimize only the brightness of the SDR image may be manually adjusted by the user while the user views the image or automatically adjusted by the camera upon evaluation of the brightness of the object in the captured image.

Figure 13:
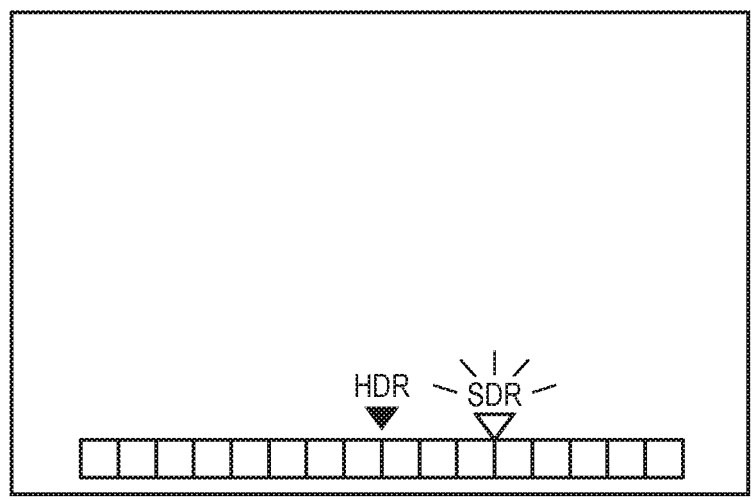
FIG. 13 is a view illustrating an exposure index highlighted on an exposure indicator according to the second embodiment.

If the user is viewing only one of the HDR image or the SDR image, no change may appear on the image being viewed even if the brightness of the image not being viewed has changed, which may result in shooting of an image under exposure conditions not intended by the user. The present embodiment considers such cases and notifies the user of a change in the exposure. For example, if the user manually sets an SDR gain value while viewing the HDR image, the brightness of the HDR image the user is viewing does not change even if the gain value is changed. As a result, the user remains unaware even if the brightness of the SDR image is set to an improper level not intended by the user. In view of this, as shown in FIG. 13, by highlighting the exposure index of the image signal whose exposure has been changed, the user can recognize that the brightness of the image has changed even if the change cannot be directly seen. While FIG. 13 shows, as one example of highlighting, that the exposure index of the SDR image flashes on and off and the color of the cursor is changed, any other suitable method may be used. Highlighting may be implemented, for example, by changing the color, size, font, shape, blinking, lighting, display status, or any combination of the above, of the cursor or characters. As a result, the exposure index of an image whose exposure has been changed can be distinguished from the exposure index of an image whose exposure remains unchanged, and shooting can be performed while checking both images simultaneously without having to switch between the two images as required.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-083366, filed Apr. 24, 2018, which is hereby incorporated by reference herein in its entirety.

What is claimed is:

1. An image processing apparatus comprising:
a processing unit configured to generate a second image by processing first image, wherein a dynamic range of the first image is included in a first dynamic range and a dynamic range of the second image is included in a second dynamic range which is narrower than the first dynamic range;
a generation unit configured to generate an image that includes a distribution image for indicating luminance distribution of the first image and a scale image for indicating a predetermined luminance level in the second dynamic range, and
a control unit configured to control a display unit to display the image.

2. The apparatus according to claim 1, wherein the distribution image is a wave form monitor image in which luminance values of the first image at horizontal positions are plotted against the respective positions.

3. The apparatus according to claim 1, wherein the distribution image is a histogram image in which the number of pixels corresponding to luminance values are plotted against the luminance values.

4. The apparatus according to claim 1, wherein
the processing unit generates the second image by using a gain, and
the generation unit arranges the scale image at a position that is based on the gain.

5. The apparatus according to claim 1, wherein the predetermined luminance level is a saturation luminance level of the second dynamic range.

6. The apparatus according to claim 1, further comprising:
a first output unit configured to output the first image to an external apparatus; and
a second output unit configured to output the second image to another external apparatus.

7. An image processing apparatus comprising:
a processing unit configured to generate a second image by processing a first image, wherein a dynamic range of the first image is included in a first dynamic range and a dynamic range of the second image is included in a second dynamic range which is narrower than the first dynamic range;
a generation unit configured to generate an image that includes an indicator image for indicating an exposure index of the first image and a cursor image for indicating an exposure index of the second image in the indicator image; and
a control unit configured to control a display unit to display the image.

8. The apparatus according to claim 7, wherein
the processing unit generates the second image by using a gain, and
the generation unit arranges the cursor image at a position in the image that is based on the gain.

9. A method of controlling an image processing apparatus, the method comprising:
generating a second image by processing a first image, wherein a dynamic range of the first image is included in a first dynamic range and a dynamic range of the second image is included in a second dynamic range which is narrower than the first dynamic range;
generating an image that includes a distribution image for indicating luminance distribution of the first image and a scale image for indicating a predetermined luminance level in the second dynamic range, and
controlling a display unit to display the image.

10. The method according to claim 9, wherein the distribution image is a wave form monitor image in which luminance values of the first image at horizontal positions are plotted against the respective positions.

11. The method according to claim 9, wherein the distribution image is a histogram image in which the number of pixels corresponding to luminance values are plotted against the luminance values.

12. The method according to claim 9, wherein,
in the processing, the second image is generated by using a gain, and
in the generating, the scale image is arranged at a position based on the gain.

13. The method according to claim 9, wherein the predetermined luminance level is a saturation luminance level of the second dynamic range.

14. The method according to claim 9, further comprising:
outputting the first image to an external apparatus; and
outputting the second image to another external apparatus.

15. A method of controlling an image processing apparatus, the method comprising:
generating a second image by processing a first image, wherein a dynamic range of the first image is included in a first dynamic range and a dynamic range of the second image is included in a second dynamic range which is narrower than the first dynamic range;
generating an image that includes an indicator image for indicating an exposure index of the first image and a cursor image for indicating an exposure index of the second image in the indicator image; and
controlling a display unit to display the image.

16. The method according to claim 15, wherein,
in the processing, the second image is generated by using a gain, and
in the generating, the scale image is arranged at a position in the image based on the gain.

17. A non-transitory computer-readable storage medium storing a program for causing a computer to execute a method of controlling an image processing apparatus, the method comprising:
- generating a second image by processing a first image, wherein a dynamic range of the first image is included in a first dynamic range and a dynamic range of the second image is included in a second dynamic range which is narrower than the first dynamic range;
- generating an image that includes a distribution image for indicating luminance distribution of the first image and a scale image for indicating a predetermined luminance level in the second dynamic range, and
- controlling a display unit to display the image.

18. A non-transitory computer-readable storage medium storing a program for causing a computer to execute a method of controlling an image processing apparatus, the method comprising:
- generating a second image by processing a first image, wherein a dynamic range of the first image is included in a first dynamic range and a dynamic range of the second image is included in a second dynamic range which is narrower than the first dynamic range;
- generating an image that includes an indicator image for indicating an exposure index of the first image and a cursor image for indicating an exposure index of the second image in the indicator image; and
- controlling a display unit to display the image.

\* \* \* \* \*